United States Patent [19]

Scobie et al.

[11] Patent Number: 4,685,611
[45] Date of Patent: Aug. 11, 1987

[54] BUTTERFLY VALVE CONSTRUCTION HAVING A COMPOSITE SEAT

[75] Inventors: William B. Scobie; Paul A. Yohner, both of Houston, Tex.

[73] Assignee: Keystone International, Inc., Houston, Tex.

[21] Appl. No.: 935,522

[22] Filed: Nov. 26, 1986

[51] Int. Cl.⁴ .............................................. F16K 1/226
[52] U.S. Cl. .................................... 251/306; 251/317; 251/358
[58] Field of Search ................. 251/305, 306, 317, 358

[56] References Cited

U.S. PATENT DOCUMENTS

| | | | |
|---|---|---|---|
| 2,747,608 | 5/1956 | Grove | 251/358 X |
| 2,809,060 | 10/1957 | Thompson | 251/306 X |
| 2,991,043 | 7/1961 | Saar | 251/306 |
| 3,133,722 | 5/1964 | McGuire et al. | 251/317 X |
| 3,314,641 | 4/1967 | Overbaugh | 251/306 X |
| 4,317,558 | 3/1982 | Sherlaw | 251/306 |
| 4,402,486 | 9/1983 | Jaequist | 251/306 |

FOREIGN PATENT DOCUMENTS

| | | | |
|---|---|---|---|
| 1251117 | 9/1967 | Fed. Rep. of Germany | 251/306 |
| 2005701 | 8/1971 | Fed. Rep. of Germany | 251/358 |
| 2907294 | 8/1980 | Fed. Rep. of Germany | 251/306 |

Primary Examiner—A. Michael Chambers
Assistant Examiner—John C. Fox
Attorney, Agent, or Firm—Browning, Bushman, Zamecki & Anderson

[57] ABSTRACT

A butterfly valve having a composite, reinforced seat, the valve having a one piece body defining a radially inwardly extending annular rib, the valve seat being a U-shaped annular member of a generally resilient material and having a radially outwardly opening channel which engages the rib of the valve body to provide an interlocking engagement between the valve seat and the valve body, the seat including a series of generally U-shaped structural members made of a material more rigid than the resilient material of the seat, the U-shaped member being bonded to the seat, the U-shaped members being spaced sufficiently to permit distortion of the seat so that it can be inserted in the valve body.

19 Claims, 10 Drawing Figures

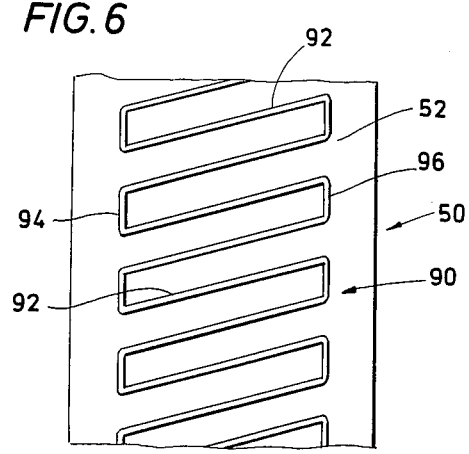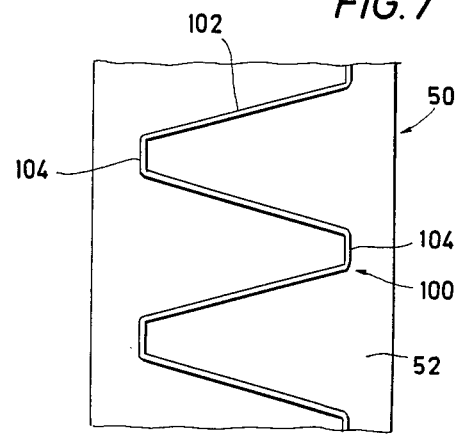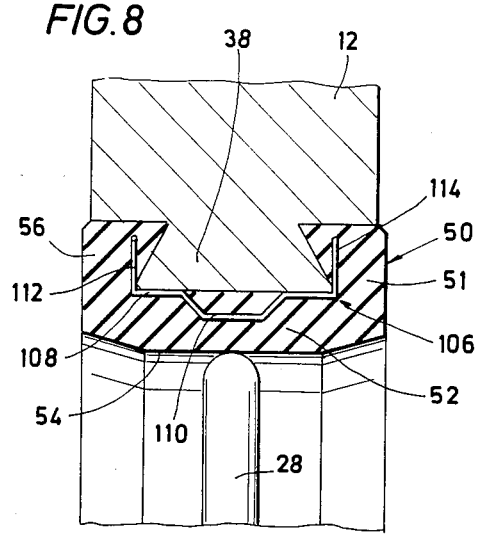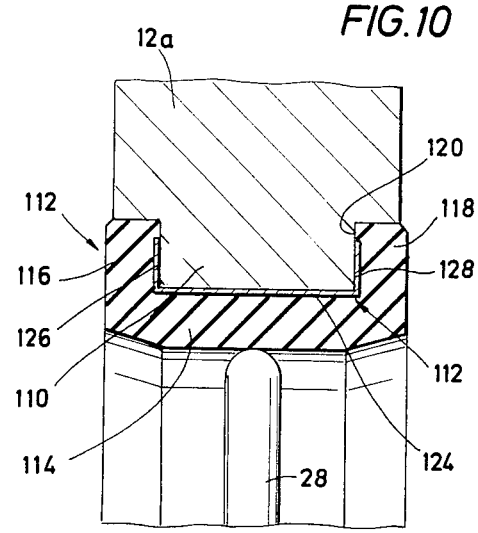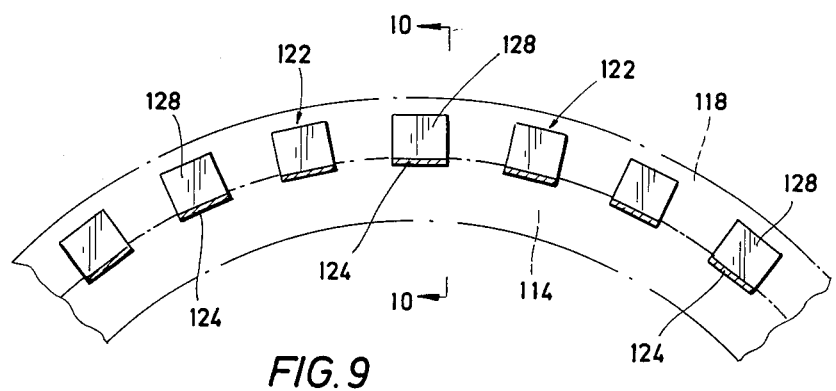

BUTTERFLY VALVE CONSTRUCTION HAVING A COMPOSITE SEAT

BACKGROUND OF THE INVENTION

1. Field of the Invention

The present invention relates to butterfly valves and, more particularly, to butterfly valves having reinforced seat members.

2. Description of the Prior Art

In a conventional butterfly valve, the valve seat against which the disk seals is made of an elastomeric material such as rubber and is disposed in a valve body which generally encircles the valve seat. For example, in U.S. Pat. No. 2,994,342 there is disclosed a butterfly valve in which the valve body has a radially inwardly extending, dovetailed rib, the flexible seat having an annular web with two radially outwardly extending, annular flanges, the web and the flanges defining a radially outwardly opening channel, complementary in shape to that of the rib. Accordingly, when the seat is received in the valve body, there is interlocking between the valve body and the elastomeric seat, the annular web serving also as a reinforcement or backup to the relatively soft resilient seat. Since, in this construction, the valve seat is quite flexible, it can easily be installed in valves which have a one piece body since the seat can be distorted sufficiently to position it in the valve body whereby the rib can be received in the annular channel. Valves constructed in this fashion suffer from the disadvantage that when the disk is in the closed position and the valve is subjected to relatively high differential pressure across the disk, there is a tendency for the resilient rubber seat to be forced into the flow path. In other words, the line pressure can get between the annular rib in the valve body and the relatively soft, pliable seat forcing the seat into the flow path and, in extreme circumstances, perhaps dislodgig the seat from the valve body.

In U.S. Pat. No. 3,233,861, there is shown another butterfly valve construction in which the valve body, rather than having any inwardly extending annular rib, forms a generally smooth cylindrical surface. The annular valve seat is composite in nature being comprised of a rigid, annular ring of a material such as metal, hard plastic or the like, and a resilient, e.g. rubber, annular member which is generally bonded to the inner and end surfaces of the rigid ring. In this construction, the composite seat is slid in and out of the valve body endwise. Moreover, the rigid ring prevents the resilient portion of the seat from being affected by differential line pressure as described above. The disadvantage of this type of valve construction is that when the valve is used in dead-end service, i.e. retaining pressure within a line when the valve is in the closed position and is located at the end of a conduit or the like, it is necessary to secure a flange over the exposed end of the valve in order to retain the composite seat in the valve body because there is no interlocking fit between the valve body and the seat.

It is known to form butterfly valves which have a composite seat structure similar to that discussed above but which also have an interlocking fit between the valve body and the seat such as shown in U.S. Pat. No. 2,994,342. Valves of this type can be used in dead-end service without the necessity for an end flange or the like to retain the seat in the valve body. Such a valve construction is shown, for example, in U.S. Pat. No. 4,225,113. In this type of construction, since the composite seat has a rigid portion which interlocks with the valve body, the seat cannot be distorted to be positioned in the valve body. Accordingly, the valve body is constructed of two sections such that the valve seat can first be positioned in a first section and then the other section of the valve body secured to the first section thereby trapping the composite seat in the valve body.

It would be desirable to have a butterfly valve in which the body was of one piece construction, in which the valve seat was interlocked to the body so the valve could be used in dead-end service, and in which the seat is composite in nature having a rigid reinforcement or backing which prevents the elastomeric portion of the seat from being forced or extended into the flow path under high pressures, by drag of the disk, etc.

SUMMARY OF THE INVENTION

It is therefore an object of the present invention to provide an improved butterfly valve.

Another object of the present invention is to provide an improved, composite seat for use in butterfly valves.

Still a further object of the present invention is to provide a butterfly valve having a one-piece body and a composite, reinforced seat which can be interlocked to the valve body.

The above and other objects of the present invention will become apparent from the drawings, the description given herein and the appended claims.

The improved, composite valve seat of the present invention has an annular, resilient member comprised of an annular web and first and second radially outwardly extending annular flanges depending from the web thereby defining a radially outwardly opening annular channel. The seat also includes a reinforcement means which is bonded to, e.g. molded in, the resilient annular member. The reinforcement means includes a plurality of circumferentially spaced spacer elements which are bonded to the web portion of the annular member and extend generally around the annular member. The spacer elements are axially extending and generally span the web. Depending from a first end of the spacer elements are a plurality of first circumferentially spaced, radially outwardly extending leg elements, the leg elements being bonded to the first flange and extending generally around the annular member. There are also a plurality of second circumferentially spaced, radially outwardly extending leg elements depending from the second end of the spacer elements, the second leg elements being bonded to the second flange and extending generally around the annular member. The spacer elements and the first and second leg elements are all made of a material such as metal, hard plastic or the like which is more rigid than the material of the resilient annular member. The reinforcing means forms an articulating series of rigid structural members or elements which permit the resilient annular member to be deformed so that it can be inserted into a one piece valve body in interlocked relationship with a rib in the valve body, but yet serves the purpose, once the seat is in the valve body, of resisting forces which act on the resilient annular member under differential pressure across the valve.

The valve of the present invention includes a body, preferably one piece in construction, which has a bore and a radially inwardly extending, annular rib. The disk is rotatably mounted in the body to control flow through the valve, the disk being rotatably journaled for rotation between an open and a closed position. The composite valve seat described above is received in the valve body, the radially outwardly opening channel engaging the radially inwardly extending annular rib so as to interlock the valve seat to the valve body.

BRIEF DESCRIPTION OF THE DRAWINGS

The invention will be more readily understood with reference to the drawings wherein:

FIG. 6 is a top, planar view, similar to FIG. 3, showing another embodiment of the reinforcement means of the composite seat of the present invention;

FIG. 7 is a top, planar view, similar to FIG. 3, showing another embodiment of the reinforcement means of the composite seat of the present invention;

FIG. 8 is a view similar to FIG. 5 showing a variation of the reinforcement means;

FIG. 9 is a view similar to FIG. 4 showing another embodiment of the reinforcement means of the composite seat of the present invention; and FIG. 10 is a view similar to FIG. 5 but taken along the line 10—10 of FIG. 9.

DESCRIPTION OF THE PREFERRED EMBODIMENT

Figure 2:
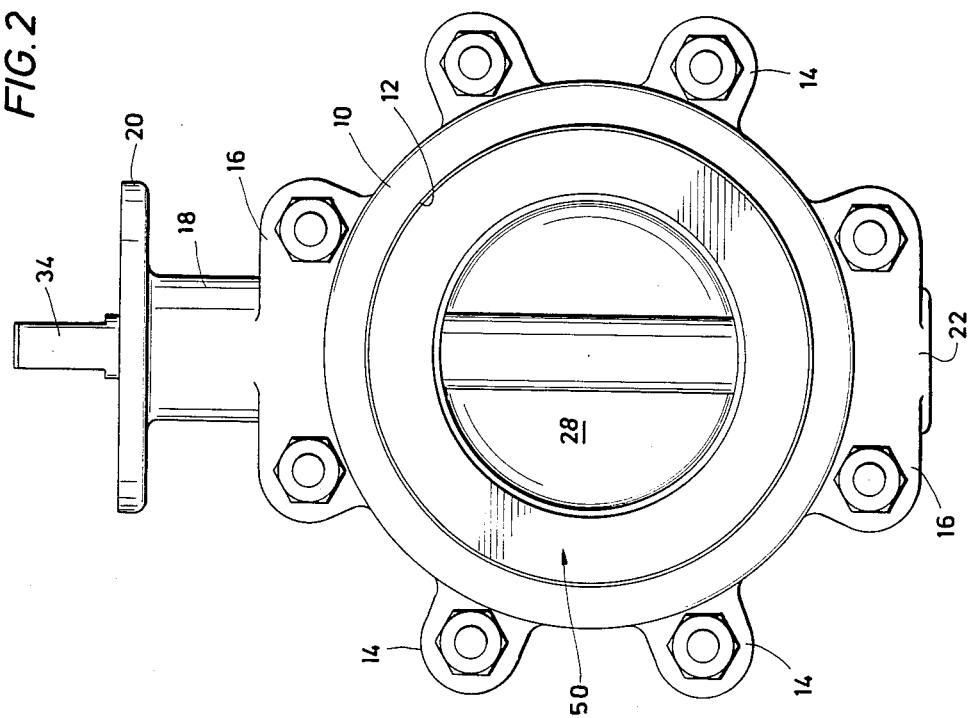
FIG. 2 is a front, elevational view of the valve shown in FIG. 1.
Figure 1:
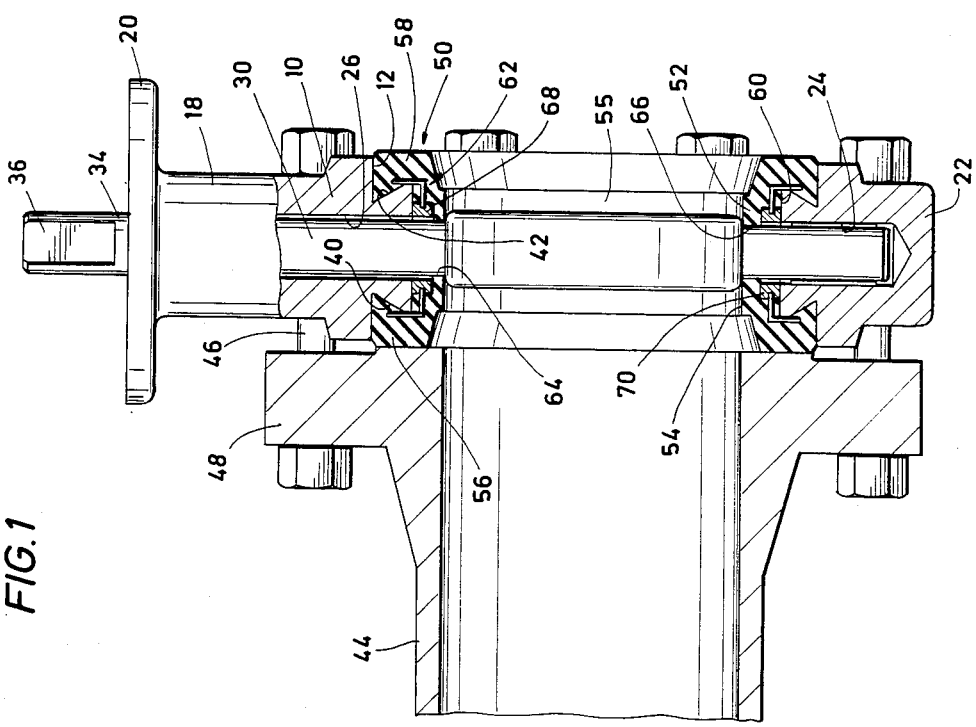
FIG. 1 is a side elevational view, partly in section, showing the valve of the present invention connected in dead-end service.

Referring first to FIGS. 1 and 2, there is illustrated a butterfly valve comprised of a one piece valve body 10 having a bore 12 therethrough. The valve body 10 is provided with a plurality of radially outwardly extending lugs 14, 16 which permit the valve body 10 to be secured to pipe flanges or the like as described hereafter. The valve body 10 is provided with an integral neck 18 projecting laterally outward therefrom, neck 18 terminating in a circular laterally outwardly projecting flange 20 upon which can be mounted an actuator (not shown) to control operation of the valve. Valve body 10 also is provided with an integral boss 22 which is disposed diametrically opposite neck 18. Boss 22 has a blind bore 24 therein while neck 18 has a registering bore 26 extending therethrough.

Disposed in body 10 is a disk 28, disk 28 being secured to stem 30 which extends through disk 28 and is received in bore 26 of neck 18 and blind bore 24 of boss 22. Provision is made, e.g. bushing, to rotatably journal stem 30 in bores 26 and 24, conventional means (not shown) being used to seal around stem 30 to prevent leakage out of the valve. Stem 30 extends out of body 10 and has an end portion 34 with wrench flats 36 to permit connection of the stem 30 to an actuator or the like. Since stem 30 is fixed to disk 28, rotation of stem 30 results in rotation of disk 28, i.e. disk 28 can be open or closed to control flow through the valve. Valve body 10 is provided with an annular, radially inwardly extending rib 38, rib 38, as shown, having a dovetailed configuration when viewed in transverse cross section. Thus, rib 38 and body 10 cooperatively define annularly extending, undercut recesses 40 and 42.

In the configuration shown in FIG. 1, the butterfly valve is connected for dead-end service. Thus, the valve is affixed to the end of a conduit or pipe 44 by means of bolts 46 which are received in registering bores (not shown) in lugs 14, 16, and in an annular flange 48 secured to pipe 44. It can be seen from FIG. 1 that when the valve is in this configuration, and the disk 28 in the closed position, any line pressure internally of pipe 44 sets up a differential pressure across disk 28.

Received in body 10 is a composite valve seat shown generally as 50. Valve seat 50 comprises an annular member of resilient material having an annular web 52 including a radially inwardly, annular sealing surface 54 which engages the periphery of disk 28 when the valve is in the closed position and defines a flowway 55 through the valve. Seat 50 further includes a first, radially outwardly extending, annular flange 56 depending from one, axial end of web 52 and a second, radially outwardly extending, annular flange 58 depending from the other, axial end of web 52. Flanges 56 and 58 thus cooperate with web 52 to define a radially outwardly opening, annular channel 60, channel 60, as best shown in FIG. 1, when viewed in cross section, having a dovetail configuration complementary to that of the dovetail configuration of the rib 38. Accordingly, when the annular composite seat 50 is received in the body 10, the rib 38 is received in the channel 60 to interlock the seat 50 to the body 10, i.e. radially outer portions of the flanges 56 and 58 are received in the recesses 40 and 42, respectively.

The composite seat 50 further includes a reinforcing means or insert shown generally as 62 and described more fully below. The seat 50 is provided with diametrically opposite, registering bores 64 and 66. Molded in seat 50 and secured to reinforcing means 62 is a first, upper collar 68 in generally surrounding relationship to bore 60. Also molded in seat 50, attached to reinforcing means 62 and in generally surrounding relationship to bore 66, is a collar 70. Bores 64 and 66 cooperate with collars 68 and 70, respectively, to allow shafts 30 and 32 to be rotatably journaled through the seat 50.

Figure 3:
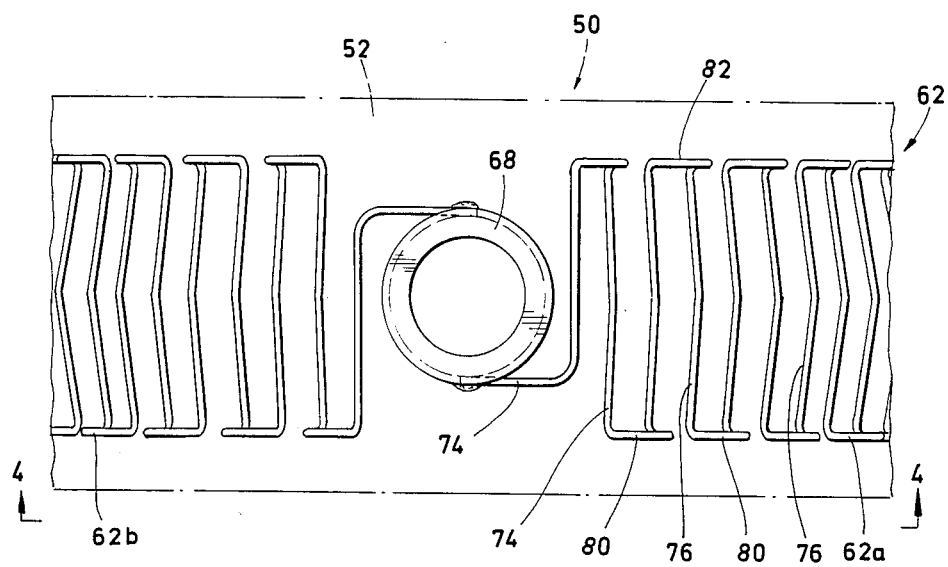
FIG. 3 is a top, planar view of a segment of the reinforcing means used in the composite valve seat of the present invention.
Figure 4:
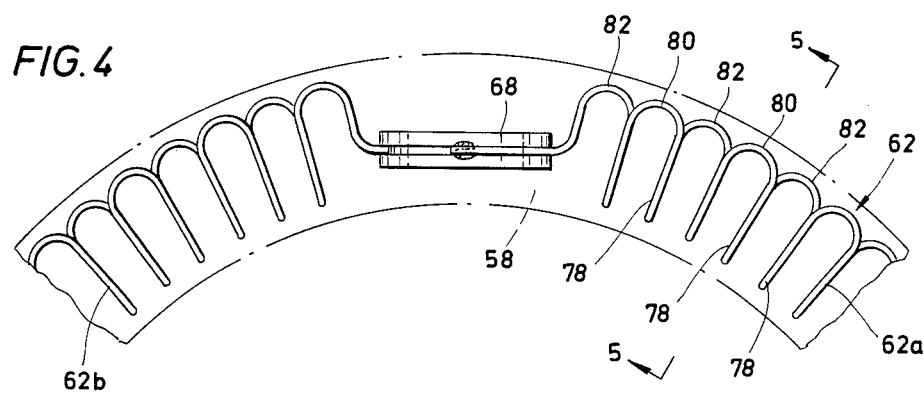
FIG. 4 is a side, elevational view of the reinforcement means shown in FIG. 3, the view being taken along the line 4—4 of FIG. 3.
Figure 5:
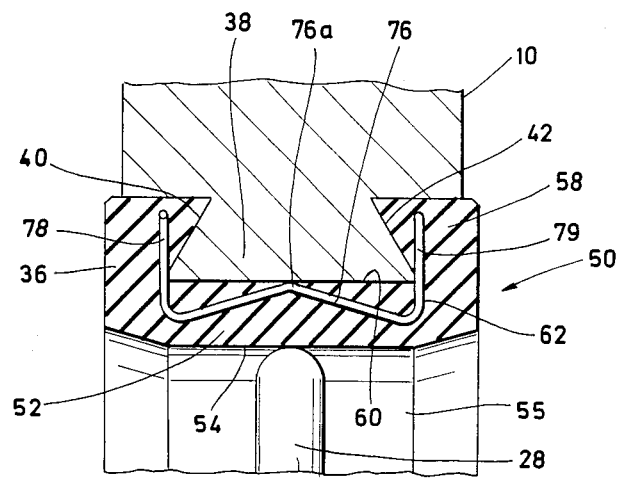
FIG. 5 is a cross-sectional view of a portion of the valve body with the composite valve seat of the present invention and shows a view of the reinforcement means taken along the line 5—5 of FIG. 4.

Referring now to FIGS. 3-5, the reinforcing means 62 is shown in greater detail. The reinforcing means 62 comprises two, generally semi-circular segments or sections 62a and 62b. Each of the segments 62a, 62b is secured, as by welding, to collar 68. It is to be understood that segments 62a and 62b, are likewise secured, as seen in FIG. 1, to collar 70 to thereby form an articulating, annular structure comprised of semi-circular segments 62a and 62b and connecting collars 68 and 66. For purposes of simplicity, only segment 62a will be described in detail, it being understood that segment 62b is substantially identical in construction. Segment 62a is comprised of a material which is more rigid than the resilient, generally elastomeric material forming the annular member which defines the web 52 and the flanges 56 and 58. In a preferred case, segment 62a is formed of a rigid, metallic wire member, although rigid plastic wire members could be used as well. Basically, segment 62a takes the form of a loosely wound spring in that it is comprised of successive convolutions and is flexible such that it can be distorted within limits without permanent deformation or change in its structure.

However, unlike typical springs, the segment 62a has both distinct axial components and distinct radial components. The segment 62a has a first end 74 which is affixed, as by welding, to collar 68 and includes a plurality of axially extending spacer elements 76 molded into and generally spanning web 52 and which are circumferentially spaced and, as shown, extend generally around the seat 62, i.e. when sections 62a and 62b are considered together, the axially extending spacer elements 76 extend substantially completely around seat 62 with the exception of where the sections 62a and 62b are joined to the collars 68 and 70.

Depending from opposite ends of the spacer elements 76, extending radially outwardly therefrom and molded in first and second flanges, respectively, are first and second leg elements. First leg elements 78, which are molded in first flange 56, depend from one end of the spacer elements 76, which second leg elements 79 are molded in second flanges 58 and depend from the opposite end of the spacer elements 76. The leg elements are circumferentially spaced as shown and, as described above with respect to the spacer elements 76, extend generally around the annular resilient member forming seat 62. Each pair of adjacent leg elements, e.g. leg elements 78 or 79, when viewed in elevation as shown in FIG. 4, form a U-shaped structure, the legs 78 being interconnected by a bridge element 80. In like fashion, the second set of leg elements 79 are so formed and connected by bridge elements 82. Thus, in the embodiment shown in FIGS. 3-5, each spacer element 76 has its opposite ends connected to spaced leg elements, e.g. 78, 79, successive spacer elements being interconnected to one another by an adjacent pair of leg elements and a bridge element, e.g. 80. Thus, each of the segments 62a, 62b can be formed from a single piece of rigid material such as wire or the like which is formed in a sinuous or serpentine form such that the spacer elements form a serpentine or sinuous pattern as shown in FIG. 3, successive segments 76 of the pattern being interconnected by an adjacent pair of leg elements and a bridging element.

With reference to FIG. 5, it can be seen that the spacer elements 76 have a generally centrally disposed, radially outwardly extending projection 76a. Projections 76a tend to hold web 52 radially outwardly in tight engagement with rib 38.

It will thus be appreciated that the reinforcement means 62 resembles a spring in that it is comprised of successive, interconnected convolutions, the elements forming the convolutions being rigid within themselves, but the elements being flexibly interconnected, i.e., the segments 62a or 62b can be distorted without any substantial distortion, e.g. yield, of the individual elements making up the convolutions. In this manner, when the reinforcing means 62 is molded in the resilient material forming the annular member of the seat 50, the seat 50 may be distorted sufficiently to insert it into the body 10 and permit the channel 60 in the seat 50 to engage the rib 42 thereby interlocking the seat 50 to the body 10. However, when the seat 50 has been positioned in the valve 10, the reinforcement elements, e.g. spacer elements 76 and leg elements 78, of the reinforcement means 62, being substantially more rigid than the material forming the web and flange of the annular resilient member, prevent undue distortion of the resilient portion of the seat 50 caused by high differential pressure across the valve, dragging of the disk across the seat, etc.

The reinforcement means 62 described above need not be made of a metal or the like which is normally considered a "spring material." Rather, when a metal is used, the reinforcement means 62a can be formed from ordinary mild steel in the form of a wire. The only characteristic which the material of the reinforcement means 62 should have, when it takes the form of the spring-like member 62 described above, is that it possess sufficient flexibility such that the seat can be distorted to a sufficient degree to allow it to be positioned in the one piece valve body such that the rib can be received in the channel in the valve seat. Nor is it necessary that the leg elements and the spacer elements be interconnected, e.g. that segment 62a be formed from a single piece. From a manufacturing point of view, forming the spacer elements and leg elements from a single piece into the convoluted form makes it easier to position the reinforcing means or member in the mold when the seat is being formed. However, the reinforcement means 62 shown in FIG. 3 could be formed by a series of separate structural pieces comprising a spacer element and first and second leg elements.

FIGS. 6 and 7 show variations of the reinforcement means. With reference to FIG. 6, the reinforcement means 90 is also in a general spring-like form comprising a series of spacer elements 92 which, like spacer elements 76, are axially extending and generally span the width of and are bonded to web 52. However, unlike the spacer elements 76 which are generally parallel to an axis passing axially through the valve seat, the spacer elements 92 are at an angle to such axis. However, the spacer elements 92 still form a sinuous or serpentine pattern and extend generally around the annular seat 50. Like reinforcement means 62, reinforcement means 90 is made of a material more rigid than the resilient material of the seat. The reinforcement means 90 also has a plurality of circumferentially spaced leg elements (not shown) which like legs 78 and 79 project radially outwardly, i.e. out of the plane of the drawing, as shown and are bonded to the flanges of the seat. The legs also include bridge elements 94 and 96 which connect adjacent leg elements. Like reinforcement means 62, reinforcement means 90 provides the essential, generally U-shaped structural member comprised of spacer elements 92 and the first and second leg elements.

In FIG. 7, the reinforcement means 100 has spacer elements 102 which alternate direction such that alternating spacer elements are parallel to one another while adjacent spacer elements are at an angle to one another, thereby forming a generally sawtooth configuratio. The leg elements (not shown) are connected by bridge elements 104.

FIG. 8 shows a reinforcement element 106 which basically differs from reinforcement elements 62 shown in FIGS. 3, 4 and 5 in that the spacer elements 108 have radially inwardly projecting formations 110. As in the case of reinforcement means 62, reinforcement means 106 has leg elements 112 and 114 which are received by bonding or molding into flanges 56 and 58, respectively. The radially inward formation 110 on spacer elements 108 minimizes distortion of the web 52 when the disk 28 is moved to the closed position as shown. Thus, with the valve in the closed position, formations 110 resist differential pressure attempting to act against the sealing surface 54 of web 52 and in effect extrude the resilient material of the seat 50 downstream. As is the case with the embodiment shown in FIGS. 6 and 7, the leg elements which are received in the flange elements of the composite seat retain the flanges into engagement with the body 12 and the rib 38, thereby preventing line pressure from getting between the rib 38 and the seat 50.

FIGS. 9 and 10 show another embodiment of the reinforcement means of the present invention. In addition, valve body 12a, instead of having the dovetail shaped rib 38, is provided with a radially inwardly extending annular rib 110 which is generally rectangular when viewed in transverse cross section. Composite seat 112 has an annular web portion 114 of resilient material and first and second, radially outwardly extending, annular flanges 116 and 118, respectively, which depend from web 114 and which, in conjunction with web 114, define a radially outwardly opening, annular channel 120 which, when viewed in transverse cross section, is rectangular in configuration. Channel 120, being complementary in shape to rib 110, when seat 112 is received in body 12a, seat 112 is interlocked to body 12a. The reinforcement means 122 in seat 112 comprises a plurality of spaced U-shaped clips, each of which consists of a spacer element 124, a first leg 126 and a second leg 128. The spacer element 124 is bonded to web 114 while legs 126 and 128 are bonded to flanges 116 and 128, respectively. As shown with reference to FIG. 9, the U-shaped clips 122 are closely spaced to one another and are disposed in the circumferential pattern around seat 112. Each of the U-shaped clips 122 is comprised of a material more rigid than the material of the resilient portion of the seat 112, the U-shaped clips 122 conveniently being made of metal or a rigid plastic. The clips 122 serve the same purpose and function, in essentially the same manner, as the spring-like reinforcement means, e.g. 62, 90, 100 described above. Thus, the generally rigid U-shaped structural member having the legs bonded to the resilient flanges keeps the flanges in snug engagement with the axially opposite sides of the rib 110. Any force resulting from line pressure between the rib 110 and the upstream set of legs 116 or 118 and which would tend to force the flanges 128 or 126 into the flowpath is resisted.

Thus, it can be seen that the reinforcement means comprises a plurality of spaced, flexibly connected U-shaped members in which the material of the U-shaped member is more rigid than the resilient or elastomeric material of the seat. The flexible connector may be accomplished by elements which actually form part of the reinforcement mean sas in FIG. 3 or by virtue of the fact that the U-shaped members are embedded in and spaced from one another by the resilient material forming the seat as in FIGS. 9 and 10. The only requisite is that the reinforcement means provides a structure which can be distorted sufficiently to permit the composite seat to be interlocked to a radially inwardly extending annular rib in a one piece valve body.

The circumferential spacing of the U-shaped structural members, whether they take the form of that shown in FIGS. 3, 6, 7, etc. or the form shown in FIG. 10, need be such that there is sufficient flexibility for seat distortion as described above but be close enough to resist the action of differential line pressure acting on the resilient seat when the valve is in the closed position in such a way that the resilient seat is extruded or forced into the flowway. Thus, it will be apparent that the spacing between the U-shaped structural members forming the reinforcement means will vary with the type of material used. Thus, for example, U-shaped clips 122 which are made of a material having a substantially greater width than wire from which reinforcement means 62 is made would generally have a different spacing. The spacing will also be dependent upon the pressure ranges to be encountered by the valve. For example, at high pressures, e.g. 200 psi and greater, the spacing of the U-shaped members forming the reinforcement means is desirably closer than in a valve subjected to lower pressure, e.g. 100 psi or less.

In the description above, reference has been made to the leg elements being bonded to the flanges of the seat and the spacer element bonded to the web of the seat. While in the preferred case the seat is formed with the reinforcement means generally molded in the seat such that the spacer elements and leg elements are totally encapsulated within the resilient material of the seat, it is contemplated, particularly as shown in FIG. 10, to bond the reinforcement means to the surface of the resilient member defining the channel rather than having the reinforcement means totally encapsulated. Thus, the term "bonding" as used herein is intended to include both total encapsulation or bonding to the surface as well as any other method by which the rigid reinforcement means can be secured to the resilient portion of the composite seat.

Virtually any type of resilient or elastomeric material commonly used to form valve seats for butterfly valves can be used in forming the composite seats of the present invention. Thus, natural and synthetic rubbers and other polymeric material generally used to form butterfly valve seats can be used.

To demonstrate the effectiveness of a valve employing the composite seat of the present invention, the rubber seat of a butterfly valve similar to that shown in FIG. 1 was replaced with a composite seat of the present invention. The valve employing the conventional rubber seat was rated for a maximum of 75 psi when used in dead-end service. The valve employing the composite seat of the present invention was able to withstand pressures in excess of 250 psi without any flange on the open end of the valve supporting the seat.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A butterfly valve comprising:
   a body having a bore therethrough, said body including a radially inwardly extending, annular rib;
   a disk rotatably mounted in said body and adapted to be rotated between an open and a closed position;
   a composite valve seat disposed in said body, said valve seat comprising;
   an annular, resilient member having an annular web and first and second, spaced, radially outwardly extending annular flanges depending from said web, said web and said flanges defining a radially outwardly opening annular channel, said rib being received in said channel;
   a reinforcement means bonded to said resilient annular member, said reinforcement means comprising:
   a plurality of circumferentially spaced, generally axially extending spacer elements, said spacer elements being bonded to said web and extending generally around said annular member;

a plurality of first, circumferentially spaced, radially outwardly extending leg elements, said first leg elements depending from a first end of said spacer elements, said first leg elements being bonded to said first flange and extending generally around said annular member; and a plurality of second, circumferentially spaced, radially outwardly extending leg elements, said second leg elements depending from a second end of said spacer elements, said second leg elements being bonded to said second flange and extending generally around said annular member;

said spacer elements and said first and second leg elements being made of a material that is more rigid than the material of said resilient annular member.

2. The butterfly valve of claim 1 wherein said body is of one piece construction.

3. The butterfly valve of claim 1 wherein said annular channel has a shape complementary to said annular rib.

4. The butterfly valve of claim 1 wherein said annular rib has a dovetail configuration when viewed in transverse cross section.

5. The butterfly valve of claim 4 wherein said annular channel has a shape complementary to said annular rib.

6. The butterfly valve of claim 1 wherein said reinforcement means comprises a plurality of individual, U-shaped clips.

7. The butterfly valve of claim 1 wherein said spacer elements and said first and second leg elements are interconnected to one another.

8. The butterfly valve of claim 7 wherein said reinforcement means comprises a rigid wire member, said spacer elements forming a generally serpentine pattern.

9. The butterfly valve of claim 8 wherein said reinforcement means comprises first and second, generally semi-circular sections, each of said sections being formed from a single piece of said rigid wire member, and wherein a first end of said first and second sections are secured to a first rigid collar and a second end of said first and second sections are secured to a second rigid collar, said seat having generally diametrically opposite first and second bores therethrough for receiving stem members, said first collar being disposed in surrounding relationship to said first bore, said second collar being disposed in surrounding relationship to said second bore.

10. The butterfly valve of claim 1 wherein said spacer elements have central portions projecting radially outwardly.

11. The butterfly valve of claim 1 wherein said spacer elements have central portions projecting radially inwardly.

12. A valve seat for a butterfly valve comprising:
an annular, resilient member having an annular web and first and second, spaced, radially outwardly extending annular flanges depending from said web, said web and said flanges defining a radially outwardly opening annular channel;

a reinforcement means bonded to said resilient annular member, said reinforcement means comprising:
a plurality of circumferentially spaced, generally axially extending spacer elements, said spacer elements being bonded to said web and extending generally around said annular member;

a plurality of first circumferentially spaced, radially outwardly extending leg elements, said first leg elements depending from a first end of said spacer elements, said first leg elements being in said first flange and extending generally around said annular member; and a plurality of second circumferentially spaced, radially outwardly extending leg elements, said second leg elements depending from a second end of said spacer elements, said second leg elements being bonded to said second flange and extending generally around said annular member;

said spacer elements and said first and second leg elements being made of a material that is more rigid than the material of said resilient annular member.

13. The butterfly valve of claim 12 wherein said annular channel has a dovetail configuration when viewed in transverse cross section.

14. The butterfly valve of claim 12 wherein said reinforcement means comprises a plurality of individual, U-shaped clips.

15. The butterfly valve of claim 12 wherein said spacer elements and said first and second leg elements are interconnected to one another.

16. The butterfly valve of claim 15 wherein said reinforcement means comprises a rigid wire member, said spacer elements forming a generally serpentine pattern.

17. The butterfly valve of claim 16 wherein said reinforcement means comprises first and second, generally semi-circular sections, each of said sections being formed from a single piece of said rigid wire member, and wherein a first end of said first and second sections are secured to a first rigid collar and a second end of said first and second sections are secured to a second rigid collar, said seat having generally diametrically opposite first and second bores therethrough for receiving stem members, said first collar being disposed in surrounding relationship to said first bore, said second collar being disposed in surrounding relationship to said second bore.

18. The butterfly valve of claim 12 wherein said spacer elements have central portions projecting radially outwardly.

19. The butterfly valve of claim 12 wherein said spacer elements have central portions projecting radially inwardly.

* * * * *